(12) United States Patent
Kang et al.

(10) Patent No.: US 9,971,835 B2
(45) Date of Patent: May 15, 2018

(54) PERSONALIZED DATA SEARCH SYSTEM AND METHOD THEREOF

(71) Applicant: NAVER CORPORATION, Seongnam-si, Gyeonggi-do (KR)

(72) Inventors: Taeki Kang, Seongnam-si (KR); Wooshin Kang, Seongnam-si (KR); Ho Min Park, Seongnam-si (KR)

(73) Assignee: Naver Corporation, Seongnam-si (KR)

( * ) Notice: Subject to any disclaimer, the term of this patent is extended or adjusted under 35 U.S.C. 154(b) by 361 days.

(21) Appl. No.: 14/553,409

(22) Filed: Nov. 25, 2014

(65) Prior Publication Data

US 2015/0149477 A1 May 28, 2015

(30) Foreign Application Priority Data

Nov. 27, 2013 (KR) .................. 10-2013-0145168
Nov. 27, 2013 (KR) .................. 10-2013-0145169

(51) Int. Cl.
*G06F 17/30* (2006.01)

(52) U.S. Cl.
CPC .................. *G06F 17/30864* (2013.01)

(58) Field of Classification Search
None
See application file for complete search history.

(56) References Cited

U.S. PATENT DOCUMENTS

| 2006/0041560 A1* | 2/2006 | Forman ............ G06F 17/30864 |
| 2009/0125625 A1* | 5/2009 | Shim .................. H04L 67/1002 709/226 |
| 2011/0184993 A1* | 7/2011 | Chawla .............. G06F 9/45533 707/802 |
| 2011/0252018 A1* | 10/2011 | Bhose ............... G06F 17/30864 707/711 |
| 2012/0030199 A1* | 2/2012 | Mohajer ........... G06F 17/30899 707/723 |
| 2013/0191414 A1* | 7/2013 | Srivastava ........ G06F 17/30545 707/770 |

FOREIGN PATENT DOCUMENTS

KR            101048546 B1        7/2011

* cited by examiner

*Primary Examiner* — Alex Gofman
(74) *Attorney, Agent, or Firm* — Harness, Dickey & Pierce, P.L.C.

(57) ABSTRACT

Disclosed are systems and methods for conducting a personalized data search including selecting, by a cloud server, one of a plurality of data servers that is allocated to a desired user, the selecting being in response to a search request that is received via a cloud service platform from the desired user; conducting a search, by the cloud server, using the selected data server; and providing, by the cloud server, a search result based on the conducted search to the desired user via the cloud service platform.

10 Claims, 8 Drawing Sheets

PERSONALIZED DATA SEARCH SYSTEM AND METHOD THEREOF

CROSS-REFERENCE TO RELATED APPLICATION

This application claims priority from and the benefit of Korean Patent Application No. 10-2013-0145168, filed on Nov. 27, 2013, which is hereby incorporated by reference in its entirety for all purposes as if fully set forth herein. This application also claims priority from and the benefit of Korean Patent Application No. 10-2013-0145169, filed on Nov. 27, 2013, which is hereby incorporated by reference in its entirety for all purposes as if fully set forth herein.

BACKGROUND

Field

Example embodiments relate to a personalized data search systems and/or methods.

Description of the Background

In general, an information providing service and/or a search service analyzes a keyword input from a user, searches a common database for information corresponding to the keyword, and provides a search result to the user.

For example, Korean Patent Registration No. 10-1048546 registered on Jul. 5, 2011, discloses technology for extracting a keyword from a search query input from a user, and providing a search result corresponding to the search query using the extracted keyword.

When searching for information using a common search database, a generalized search result may be acquired. However, such common search databases may become enlarged with relatively large amounts of data. Due to an enlarged search database, the search result may also become relatively large and/or massive, which may compel a user to filter a large amount of data in order to retrieve a desired result.

In particular, when searching the common search database for personalized information, in many cases, separate large equipment may be required to conduct a search due to many users searching the search database and a large amount of data stored in the search database.

SUMMARY

At least one example embodiment relates to method for conducting a personalized data search in a personalized data search system.

According to at least one example embodiment, a method for conducting a personalized data search in a personalized data search system is provided. The personalized data search system includes a cloud server. The cloud server includes a plurality of data servers. Each of the plurality of data servers store personalized data for users. The method includes selecting one of the plurality of data servers that is allocated to a desired user, the selecting being in response to a search request that is received via a cloud service platform from the desired user; conducting a search using the selected data server; and providing a search result based on the conducted search to the desired user via the cloud service platform.

At least one example embodiment provides that the conducting the search includes conducting, by the selected data server, the search using an index volume stored in a disc of the selected data server.

At least one example embodiment provides that the conducting of the search includes creating a configuration file to conduct a search on the selected data server; and loading an index volume stored in a disc of the selected data server at a time at which the search is to be conducted.

At least one example embodiment provides that the personalized data search system further includes an index request control server, and the method further includes identifying, by the index request control server, the cloud server in response to an index request for personalized data that is received via the cloud service platform from the desired user; retrieving, by the index request control server, the cloud server in response to an index request for personalized data that is input by the desired user through the cloud service platform by the desired user; selecting, by the index request control server, a data server from among the plurality of data servers included in the cloud server, the selected data server being previously allocated to the desired user; and performing, by the selected data server, an indexing job based on personalized data stored in a disc of the selected data server.

At least one example embodiment provides that the selecting of the data server includes selecting the data server from among the plurality of data servers having a smallest load relative to a load of each of the other data servers from among the plurality of data servers.

At least one example embodiment provides that the performing the indexing job includes distributing, by the selected data server, an index volume created through the indexing job to each of the data servers of the plurality of data servers that are allocated to the desired user.

At least one example embodiment relates to a personalized data search system.

According to at least one example embodiment, a personalized data search system includes a cloud server including a plurality of data servers, each of the plurality of data servers being configured to store personalized data for users; a search application program interface (API) server configured to request the cloud server to conduct a search for personalized data associated with a desired user, the search API server requesting the cloud server in response to receiving a search request that is received via a cloud service platform from the desired user, receive a search result from the cloud server, and provide the received search result to the desired user through the cloud service platform; and the cloud server is configured to select a data server from among the plurality of data servers that is allocated to the desired user, and conduct the search using an index volume stored in a disc of the selected data server.

At least one example embodiment provides that the personalized data search system further includes an index request control server configured to allocate an index to a desired data server among the plurality of data servers. At least one example embodiment provides that, in the allocating, the index request control server is configured to allocate the index in response to an index request for personalized data that is received from the desired user via the cloud service platform.

At least one example embodiment provides that the desired data server is configured to perform an indexing job using personalized data stored in a disc of the desired data server, and distribute the index volume created through the indexing job to each of the plurality of data servers.

At least one example embodiment relates to a method for conducting a personalized data search in a personalized data search system.

According to at least one example embodiment, a method for conducting a personalized data search in a personalized data search system is provided. The personalized data search system includes a cloud server and a search server. The cloud server includes a plurality of data servers. Each of the plurality of data servers stores personalized data for users. The search server is independent from the cloud server. The method includes accessing, by the search server, a disc of a data server of the plurality of data servers that is allocated to a desired user in response to a search request received from the desired user via a cloud service platform; reading, by the search server, an index volume stored in the disc of the accessed data server; conducting, by the search server, a search for personalized data within the disc of the accessed data using the read index volume; and providing, by the search server, search results to the desired user.

At least one example embodiment provides that the accessing includes creating a symbolic link in real time using a search path with respect to the index volume stored in the disc of the accessed data server.

At least one example embodiment provides that the method includes selecting, by the cloud server, the data server allocated to the desired user from among the plurality of data servers in response to the search request received from the desired user via the cloud service platform; creating, by the cloud server, a configuration file to conduct the search on the selected data server; and distributing, by the cloud server, the configuration to the search server. The accessing comprises accessing the disc of the selected data server based on the configuration file.

At least one example embodiment provides that the conducting includes conducting the search by loading an index volume stored in the disc of the accessed data server at a time at which the search is to be conducted.

At least one example embodiment provides that the personalized data search system further includes an index request control server, and the method further includes retrieving, by the index request control server, the cloud server in response to an index request for personalized data received from the desired user via the cloud service platform; selecting, by the index request control server, a data server from among the plurality of data servers that is allocated to the desired user; and performing, by the selected data server, an indexing job based for personalized data associated with the desired user that is stored in a disc of the selected data server.

At least one example embodiment provides that the selecting the data server includes selecting the data server from among the plurality of data servers having a smallest load relative to a load of each of the other data servers from among the plurality of data servers.

At least one example embodiment provides that the performing of the indexing job includes distributing, by the selected data server, an index volume created through the indexing job to each of the plurality of data servers that are allocated to the desired user.

According to at least one example embodiment, a personalized data search system includes a cloud server including a plurality of data servers, each of the plurality of data servers being configured to store personalized data for users; a search server independent of the cloud server and configured to search for the personalized data stored in the cloud server; a search application program interface (API) server configured to request the search server for a search of personalized data of a desired user in response to a search request that is received from the desired user via a cloud service platform and provide the search results to the desired user via the cloud service platform; and the search server is configured to read an index volume stored in disc of a selected data server of the plurality of data servers; conduct the search for the personalized data by accessing the disc of the selected data server, and provide the search results to the desired user via the cloud service platform.

At least one example embodiment provides that the cloud server is configured to select the data server from among the plurality of data servers in response to the search request, create a configuration file to conduct the search for the personalized data on the selected data server, and distribute the configuration file to the search server. At least one example embodiment provides that the search server is configured to create a symbolic link in real time using a search standard path with respect to the index volume stored in the disc of the selected data server based on the configuration file.

At least one example embodiment provides that the personalized data search system includes an index request control server configured to allocate an index to a desired data server among the plurality of data servers in response to an index request for personalized data that is received via the cloud service platform from the desired user.

At least one example embodiment provides that the desired data server is configured to perform the indexing job using personalized data stored in a disc of the desired data server, and distribute the index volume created through the indexing job to each of the plurality of data servers.

It is to be understood that both the foregoing general description and the following detailed description are explanatory and are intended to provide further explanation of the example embodiments as claimed.

BRIEF DESCRIPTION OF THE DRAWINGS

The accompanying drawings, which are included to provide a further understanding of the example embodiments and are incorporated in and constitute a part of this specification, illustrate example embodiments, and together with the description serve to explain the principles of the example embodiments.

DETAILED DESCRIPTION OF EXAMPLE EMBODIMENTS

Figure 1:
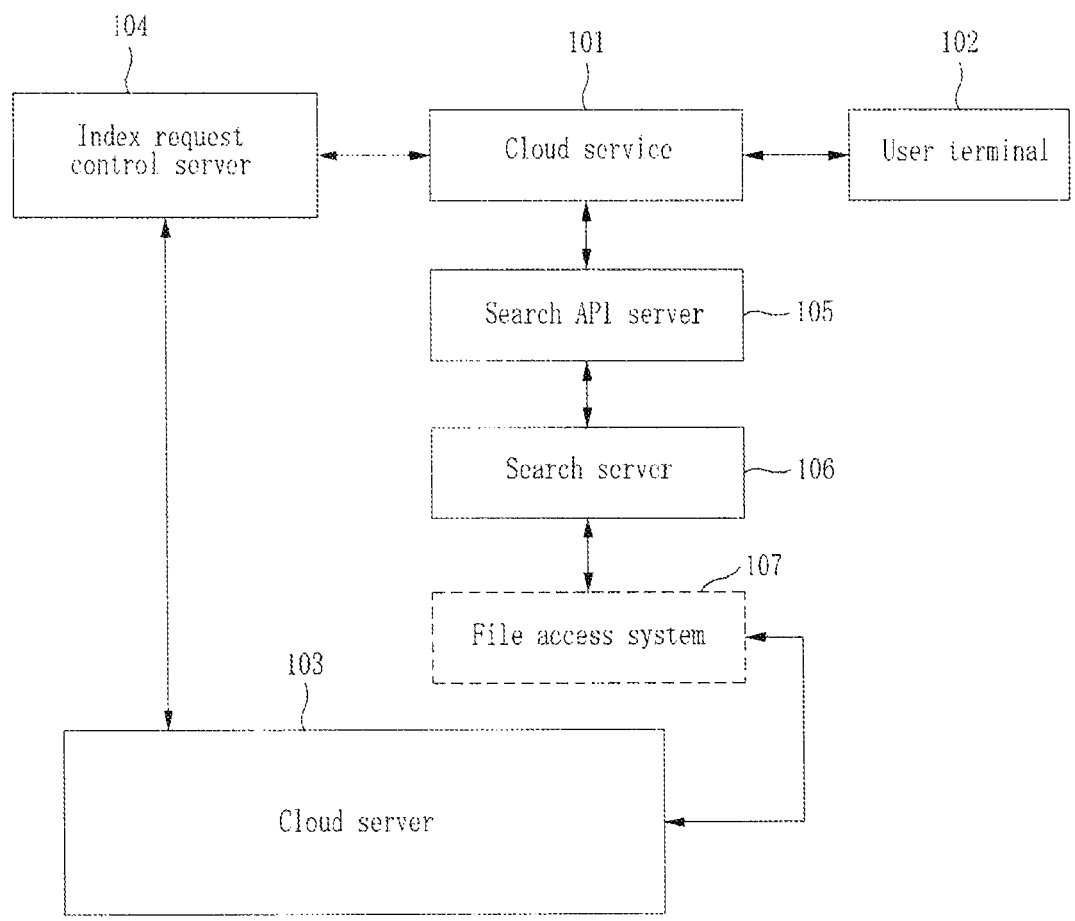
FIG. 1 illustrates a configuration of a personalized data search system according to example embodiments.

The invention is described more fully hereinafter with reference to the accompanying drawings, in which example embodiments are shown. This invention may, however, be embodied in many different forms and should not be construed as limited to the example embodiments set forth herein. Rather, these example embodiments are provided so that this disclosure is thorough, and will fully convey the scope of the invention to those skilled in the art. In the drawings, the size and relative sizes of layers and areas may be exaggerated for clarity. Like reference numerals in the drawings denote like elements.

Example embodiments will now be described more fully with reference to the accompanying drawings in which example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments to those of ordinary skill in the art. In the drawings, the thicknesses of layers and areas are exaggerated for clarity. Like reference numerals in the drawings denote like elements, and thus their description may be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, areas, layers and/or sections, these elements, components, areas, layers and/or sections should not be limited by these terms. These terms are only used to distinguish one element, component, area, layer or section from another element, component, area, layer or section. Thus, a first element, component, area, layer or section discussed below could be termed a second element, component, area, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of areas illustrated herein but are to include deviations in shapes that result, for example, from manufacturing. For example, an implanted area illustrated as a rectangle will, typically, have rounded or curved features and/or a gradient of implant concentration at its edges rather than a binary change from implanted to non-implanted area. Likewise, a buried area formed by implantation may result in some implantation in the area between the buried area and the surface through which the implantation takes place. Thus, the areas illustrated in the figures are schematic in nature and their shapes are not intended to illustrate the actual shape of an area of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

According to example embodiments, personalized data may be stored using a cloud computing system, thereby providing efficient use of resources and efficient maintenance and/or repair of the system.

According to example embodiments, a search for data stored in a cloud server is conducted using the aforementioned system, an efficiency of resources may be realized through effective distribution processing, which may also provide a reduction of costs associated with providing a search system.

According to example embodiments, an efficient operation of a search system may be provided by conducting a search using only a disc of a cloud server through a configuration independent from the cloud server thereby providing an efficient search for personalized data stored in a cloud-based computing system.

Hereinafter, example embodiments will be described in detail with reference to the accompanying drawings.

Example embodiments relate to a search system and method for searching for personalized data through efficient resource usage.

The term "document" used herein indicates a unit of content drafted and/or composed by a user in a variety of forms, such as text, an image, a moving picture, and audio, and may indicate data to be searched. The term "document" in the example embodiments may indicate personalized data stored in a cloud server in association with a user.

Also, the term "document collection" indicates a file in which documents are collected.

Also, the term "index/indexing" indicates a job of modifying a document collection to be in a searchable form through a morphological analysis. For example, the index/indexing refers to a job of creating an index data set by extracting a meaningful keyword from a document included in a document collection; determining the extracted keyword as an index word; including, in the index word, information about a use frequency of the keyword, a location and/or position at which the keyword is used, and/or a document in which the keyword is used; and sorting the information for each index word.

The term "index volume" may indicate an index data set that is a final result acquired through an indexing job.

FIG. 1 illustrates a configuration of a personalized data search system according to example embodiments. As shown, the personalized data search system includes a cloud service 101, a user terminal 102, a cloud server 103, an index request control server 104, a search API server 105, a search server 106, and a file access system 107. It should be noted that the cloud service 101, the cloud server 103, the index request control server 104, the search API server 105, the search server 106, and the file access system 107 may be collectively referred to as "the servers")

User terminal 102 is a physical hardware device that is capable of running one or more applications. User terminal 102 may include a transmitter/receiver (or alternatively, a transceiver), memory, one or more processors, and/or other like components. User terminal 102 may be configured to send/receive data to/from base station 110. User terminal 102 may include one or more processors that are designed to sequentially and automatically carry out a sequence of arithmetic or logical operations; equipped to record/store digital data on a machine readable medium; and transmit and receive digital data. The one or more processors may be configured to carry out instructions of a computer program by performing the basic arithmetical, logical, and input/output operations of the system. The one or more processors may include a single-core processor, a dual-core processor, a triple-core processor, a quad-core processor, etc. The one or more processors may perform a variety of functions for the user terminal 102 and may process data by executing program code, one or more software modules, firmware, middleware, microcode, hardware description languages, and/or any other like set of instructions stored in the memory. The program code may be provided to the one or more processors by memory, one or more drive mechanisms (not shown), and/or via a network interface. In order to perform the variety of functions and data processing operations, the program code and/or software components are loaded into the one or more processors. Once the program code is loaded into the one or more processors, the one or more processors may be programmed to perform the various operations and functions delineated by the program code, thereby transforming the one or more processors into a special purpose processor. User terminal 102 may include wireless phones or smartphones, laptop personal computers (PCs), tablet PCs, wearable computing devices, and/or any other physical or logical device capable of recording, storing, and/or transferring digital data via the cloud service 101 and/or any other like network element (e.g., one or more of the servers).

The memory of the user terminal 102 (not shown) may be a hardware device configured to store an operating system and program code for one or more software components. The memory of the user terminal 102 may be a computer readable storage medium that generally includes a random access memory (RAM), read only memory (ROM), a flash memory device, a solid state disk (SSD), a secure digital (SD) card, and/or other like storage media capable of storing and recording data. The program code and/or software components may also be loaded from a separate computer readable storage medium into the memory of the user terminal 102 using a drive mechanism (not shown). Such separate computer readable storage medium may include a memory card, memory stick, removable flash drive, sim card, and/or other like computer readable storage medium (not shown). In some embodiments, software components may be loaded into the memory of the user terminal 102 via a network interface (not shown) rather than via a computer readable storage medium.

User terminal 102 may also include a transmitter and receiver. The transmitter and receiver may be any type of hardware device that generates or otherwise produces radio waves in order to communicate with one or more other devices. The transmitter and receiver may be coupled with an antenna (not shown) in order to transmit data to one or more other devices. The transmitter and receiver may be configured to receive digital data from one or more components of user terminal 102, and convert the received digital data into an analog signal for transmission over an air interface. The transmitter and receiver may be any type of hardware device that can receive and convert a signal from a modulated radio wave into usable information, such as digital data. The transmitter and receiver may be coupled with the antenna (not shown) in order to capture radio waves. The transmitter and receiver may be configured to send digital data converted from a captured radio wave to one or more other components of user terminal 102. User terminal 102 may include a transceiver (not shown) instead of transmitter and receiver, where the transceiver is a single component configured to provide the functionality of a transmitter and a receiver as discussed above.

Furthermore, in some embodiments, the user terminal 102 may include many more components than those discussed above, such as a display device, one or more image sensors, network interface, and/or other like physical hardware components. However, it is not necessary that all of these generally conventional components be disclosed in order to disclose the example embodiments.

The servers may be physical hardware devices configured to provide services for client devices (e.g., user terminal 102, etc.) and/or other network elements connected to a communications network. The servers may be any network element capable of receiving and responding to requests from one or more client devices across a computer network to provide one or more services. Accordingly, the servers may be configured to communicate with the user terminal 102 and/or other network elements via a wireless protocol. Additionally, each of the servers may be a single physical hardware device, or each of the servers may be physically or logically connected with other network devices, such that each of the servers reside on one or more physical hardware devices. The servers may employ one or more connection-oriented protocols such as Session Initiation Protocol (SIP), HTTP, and TCP/IP, and includes network devices that use connectionless protocols such as User Datagram Protocol (UDP) and Internet Packet Exchange (IPX). The servers may be configured to establish, manage, and terminate one or more communications sessions between one or more computing devices, such as between one or more of the servers and user terminal 102 and/or between user terminal 102 and another client device (not shown).

The servers may include one or more processors (not shown) and one or more data storage devices. The one or more processors may be special purpose computer processing devices configured to carry out program code stored in the one or more storage devices by performing arithmetical, logical, and input/output operations. For example, program code and/or software modules may be loaded into the one or more processors. Once the program code and/or software modules are loaded into the one or more processors, the one or more processors may be configured to perform user operations according to various example embodiments.

The one or more storage devices may be a computer readable storage medium that generally includes a random access memory (RAM), read only memory (ROM), a permanent mass storage device (such as a disk drive), and/or any other like data storage mechanism capable of storing and recording data. The one or more storage devices may be configured to store program code for one or more operating systems and/or program code for one or more software components and/or modules for performing operations according to various example embodiments. These software components may also be loaded from a separate computer readable storage medium into the one or more storage devices and/or the one or more processors using a drive mechanism (not shown). Such separate computer readable storage medium may include a floppy drive, disc, tape, Blu-ray/DVD/CD-ROM drive, memory card, removable flash memory drive, sim card, and/or other like computer readable storage medium (not shown). In some embodiments, software components may be loaded into the one or more storage devices and/or the one or more processors from a remote data storage device via a network interface, rather than via a computer readable storage medium.

The servers may also include a transmitter and receiver. The transmitter and receiver may be any type of hardware device that generates or otherwise produces radio waves in order to communicate with one or more other devices. The transmitter and receiver may be coupled with an antenna (not shown) in order to transmit data to one or more other devices. The transmitter and receiver may be configured to receive digital data from one or more components of the servers, and convert the received digital data into an analog signal for transmission over an air interface. The transmitter and receiver may be any type of hardware device that can receive and convert a signal from a modulated radio wave into usable information, such as digital data. The transmitter and receiver may be coupled with the antenna (not shown) in order to capture radio waves. The transmitter and receiver may be configured to send digital data converted from a captured radio wave to one or more other components of the servers. The servers may include a transceiver (not shown) instead of transmitter and receiver, where the transceiver is a single component configured to provide the functionality of a transmitter and a receiver as discussed above.

Furthermore, in some embodiments, the servers may include many more components than those discussed above, such as a display device, a network interface, and/or other like physical hardware components. However, it is not necessary that all of these generally conventional components be disclosed in order to disclose the example embodiments.

As shown in FIG. 1, the cloud service 101 is connected to a network through a network interface (not shown), and may communicate with a user terminal 102 connected to the network. The network may be any interconnected network of computing devices. The network may be configured to operate as one or more communication networks such as a personal area network (PAN), a local area network (LAN), a metropolitan area network (MAN), or a wide area network (WAN). Further, the network may be the internet. In some embodiments, the network may use a wireless transmission technique which is used for a short range communication, such as infrared data association (IrDA) and/or Bluetooth.

In a communication environment with the user terminal 102, the cloud service 101 may store personalized data in a cloud server 103 and/or may provide the personalized data stored in the cloud server 103 to a service platform for editing, arranging, and/or searching for the personalized data.

The cloud server (CS) 103 indicates a group of servers in which a plurality of data servers (not shown) is grouped into a single "cloud", and thus, the group of servers may operate as a single hardware computing device. It should be noted that according to example embodiments, the term "cloud" may refer to any group or set of physical hardware devices that operate as a single hardware computing device and/or are otherwise logically grouped into a single entity. Here, a data server of the plurality of data servers may be an individual server of tripled servers of the cloud server 103. Hereinafter, a description will be made by taking an example of a tripled cloud server in which three servers are grouped to be used as a single server.

In various embodiments, the data servers of the cloud server 103 may be disc servers, which include one or more disc drives configured to store data. In various embodiments, the data servers may allow users to have access to personal data stored or maintained in on ore more discs associated with the data server. In some embodiments, the data servers with disc drives may be made available only to a select group of users. The cloud server 103 stores data in a disc by grouping a plurality of data servers into a single cloud, and may write, read, and correct data using a CS application program interface (API) that is a self-API. Here, the CS API serves as an interface for requesting the cloud service 101 for a computing operation. When the cloud server 103 requests the cloud service 101 for the computing operation through the CS API, the cloud server 103 selects a single data server from among the plurality of data servers through an API program and performs a central processing unit (CPU) operation and a disc operation on the selected data server and/or on the device requesting the CPU operation and/or the disc operation.

In various embodiments, the cloud server 103 may serve as a storage medium configured to store and maintain personalized data, and may further serve as a search server configured to directly search for personalized data.

The index request control server 104 controls a process of indexing personalized data in response to an index request of the cloud service 101. The index request control server 104 may allocate user-by-user personalized data to a desired (or alternatively "predetermined") data server through the CS API, and may control the data server to perform an indexing job. Here, the cloud service 101 may request indexing of personalized data corresponding to a user of user terminal 102 in response to an occurrence of an indexing event, by a log-in of the user terminal 102, and/or a request for data (e.g., creating, editing, moving, deleting the personalized data, etc.).

The search API server 105 requests the cloud server 103 to conduct a search in response to a search request from the user terminal 102. The search request from the user terminal 102 may be issued through the cloud service 101. The search API server 105 returns a search result provided from the cloud server 103 to the user terminal 102 via the cloud service 101.

According to example embodiments, the personalized data search system may further include the search server 106 as an additional configuration. Here, the search server 106 may be configured as a system independent from the cloud server 103, and may be used as a search entity that searches for personalized data stored in the cloud server 103.

In various embodiments, the search server 106 may directly connect to one or more discs of the cloud server 103 through the file access system 107. Here, the file access system 107 is based on a file system configured as the cloud server 103 and serves as a relay or other like interface configured to enable the search server 106 to connect to one or more corresponding file systems of the cloud server 103.

Figure 2:
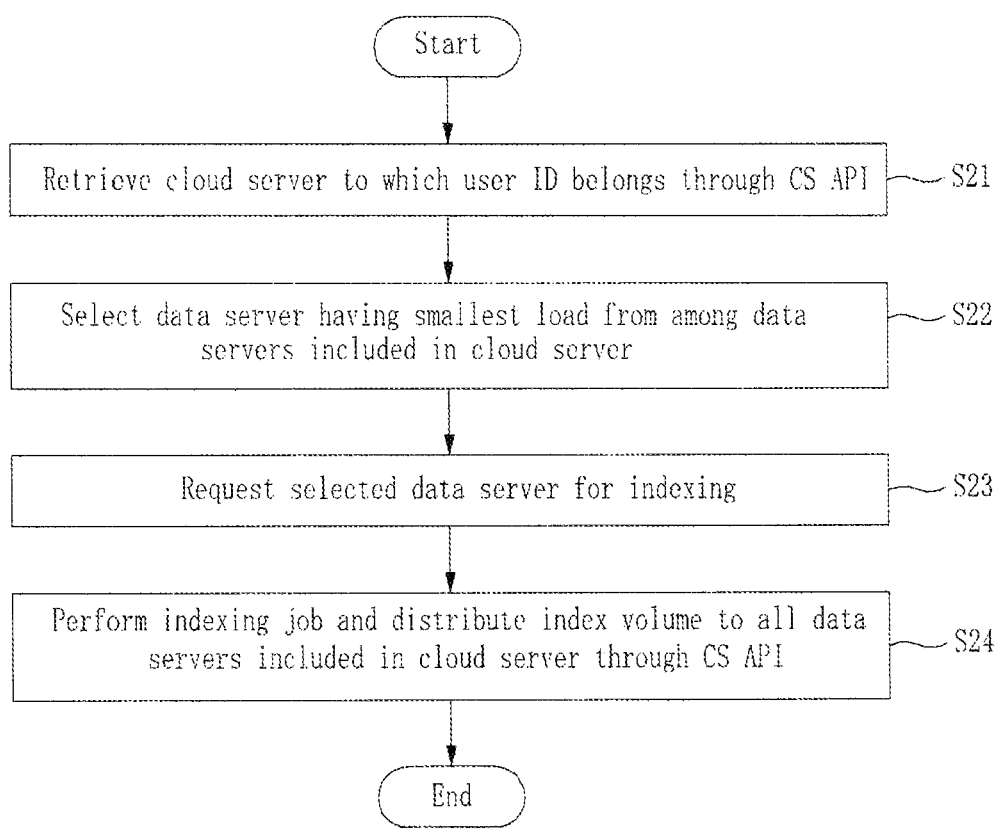
FIG. 2 illustrates an indexing method of a personalized data search system according to example embodiments.

FIG. 2 illustrates an indexing method of a personalized data search system according to example embodiments. For illustrative purposes, the indexing method as shown by FIG. 2 is described as being performed by the various entities of the personalized data search system according to example embodiments as described with reference to FIG. 1. However, it should be noted that the indexing method of FIG. 2 may be operated by any other entities or devices that have a same or similar configuration and/or design as the entities shown in FIG. 1.

In operation S21, the index request control server 104 retrieves (or identifies) the cloud server (CS) 103 to which a user identifier (ID) belongs through a CS API. The index request control server 104 may retrieve the corresponding CS 103 in response to an index request associated with the user terminal 102 that is received from the cloud service 101. In various embodiments, the personalized data is stored in the desired (or alternatively "predetermined") CS 103, and thus, a process of retrieving the CS 103 storing data the user ID through the CS API is performed.

In operation S22, the index request control server 104 selects a single data server (DS), from among a plurality of data servers included in the cloud server 103 to which the user ID belongs. In various embodiments, the index request control server 104 may select a DS from among the DSs corresponding to the user ID that has a smallest load. In some embodiments, the index request control server 104 may select a DS from among the DSs corresponding to the user ID based on one or more other criteria, such as a scope of the data within the DS (e.g., single data points, one or more time ranges, sample count, and the like), a data storage device type associated with the DS (e.g., primary storage device, secondary storage device, tertiary storage device, non-linear storage device, and the like), and/or any other like criteria.

In operation S23, the index request control server 104 requests the selected DS for indexing. In various embodiments, the index request control server 104 stores the index request received from the cloud service 101 in a database to be in a queue form. Here, the index request control server 104 may allocate, to a queue, a data server having a smallest data server among the data servers included in the cloud server 103 to which the user ID belongs and may request the data server for indexing.

In operation S24, the index request control server 104 performs the indexing job and distributes an index volume to each of the DSs included in the cloud server 103 through the CS API. In various embodiments, the DS selected by the index request control server 104 may fetch the allocated indexing job from the queue of the index request control server 104, and performs the indexing job using personalized data stored in a disc of the data server. Additionally, and the selected DS may distribute an index volume created through the indexing job to all the data servers included in the cloud server 103 to which the user ID belongs through the CS API.

According to example embodiments, it is possible to retrieve the cloud server 103 storing personalized data of a user ID, to select a most affording data server from among data servers included in the cloud server 103, and to enable the selected data server to perform an indexing job using the personalized data stored in a disc of the data server.

Figure 3:
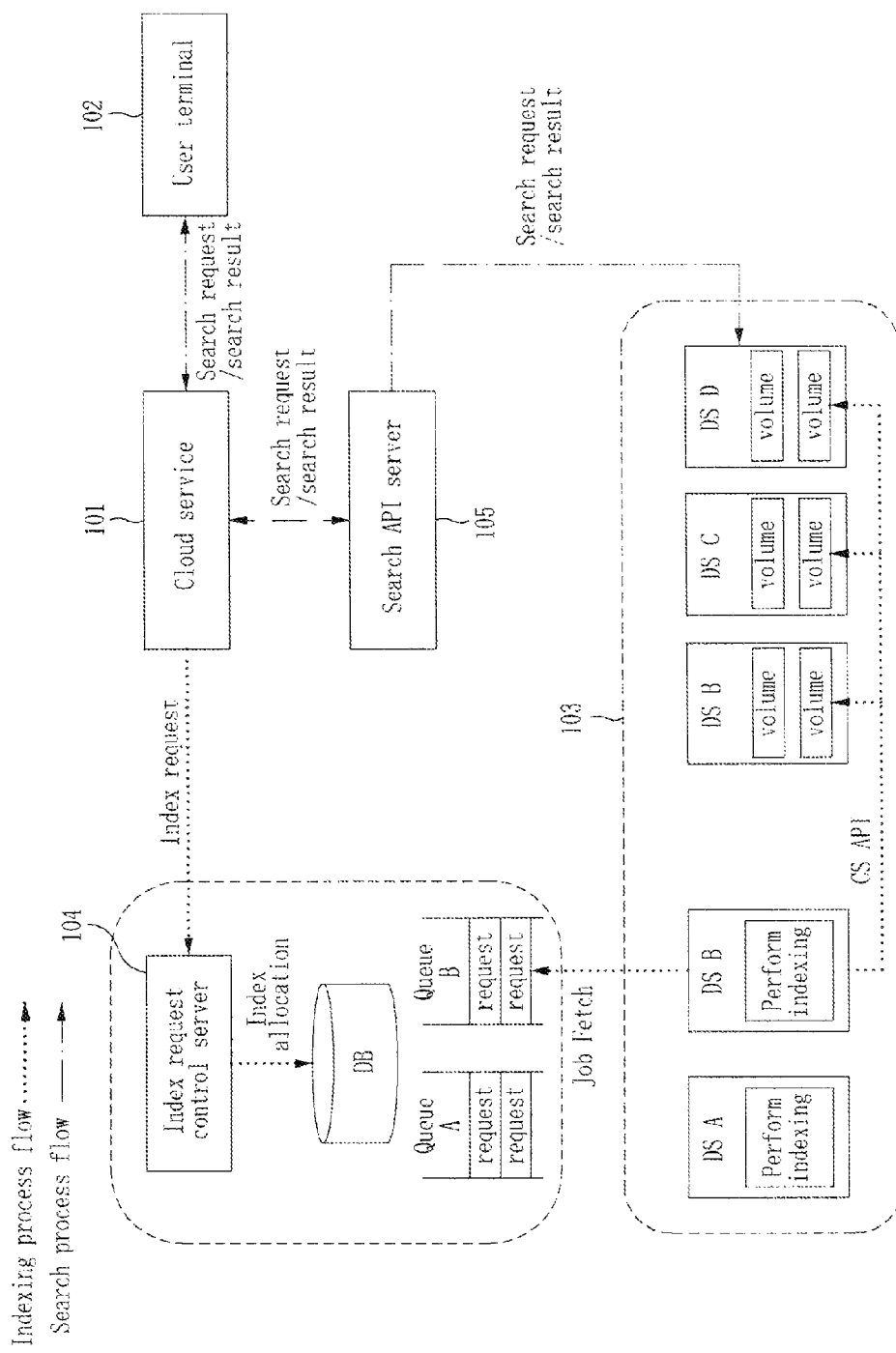
FIGS. 3 and 4 illustrate an example of a personalized data search process according to example embodiments.
Figure 4:
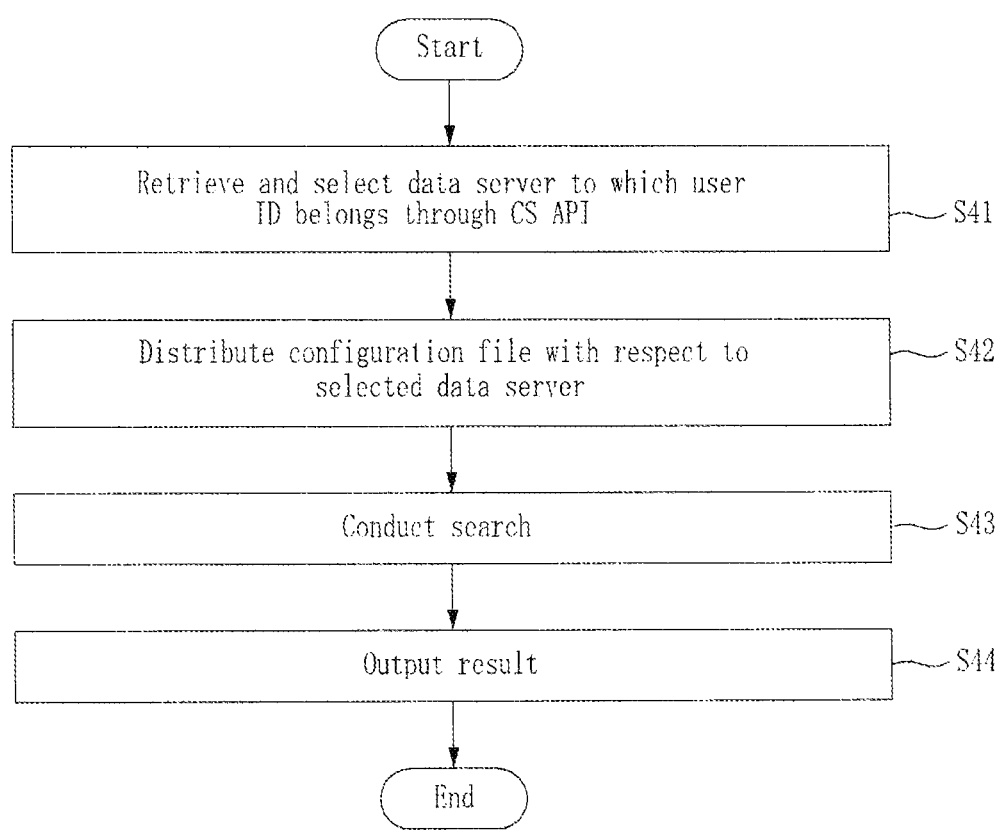

FIGS. 3 and 4 illustrate an example of a personalized data search process according to example embodiments. For illustrative purposes, the personalized data search process according to example embodiments will be described as being performed by the various entities of the personalized data search system according to example embodiments as described with reference to FIGS. 1 and 3. However, it should be noted that the personalized data search process of FIGS. 3-4 may be operated by any other entities or devices that have a same or similar configuration and/or design as the entities shown in FIG. 1.

In various embodiments, the personalized data search process employs a method of executing a daemon for a search within the cloud server 103 so that the daemon may conduct a search. It should be noted that a "daemon" may be any computer application that runs as a background application rather than being directly controlled by a user of a computing device.

Referring to FIG. 4, in operation S41, the cloud server 103 retrieves and selects a data server to which a user ID belongs through a CS API. The retrieval and selection of the data server may be in response to a search request of the user terminal 102 that is received from the cloud service 101 through the search API server 105.

In operation S42, the cloud server 103 distributes a configuration file with respect to the selected data server. In various embodiments, the cloud server 103 may create the configuration file for the search and may distribute the created configuration file to the selected data server. In some embodiments, the cloud server 103 may distribute a previously created configuration file for the search and may distribute the previously created configuration file to the selected data server.

In operation S43, the selected data server conducts the search. In various embodiments, the data server to which the user ID belongs conducts a search by loading an index volume stored in a disc of the data server to a memory based on the configuration file distributed from the cloud server 103 in operation S42, and returns a search result to the cloud service 101 through the search API server 105.

In operation S44, the cloud service 101 outputs the search result. In various embodiments, the cloud service 101 receives the search result from the data server to which the user ID belongs through the search API server 105, and outputs the search result in a user verifiable form, for example, by highlighting one or more relevant search results in a search results list providing a passage of relevant text, and the like.

In various embodiments the cloud server 103 may store a relatively large amount of data. Since a significantly large amount of data is stored in the cloud server 103, the search may not be conducted while loading the entire data to the memory. According to example embodiments, it is possible to conduct a search by (i) creating and distributing a configuration file so that a desired (or alternatively "predetermined") data server may conduct a search at a point in time at which the search is to be initiated, and (ii) by loading an index volume stored in the data server to a memory.

Figure 5:
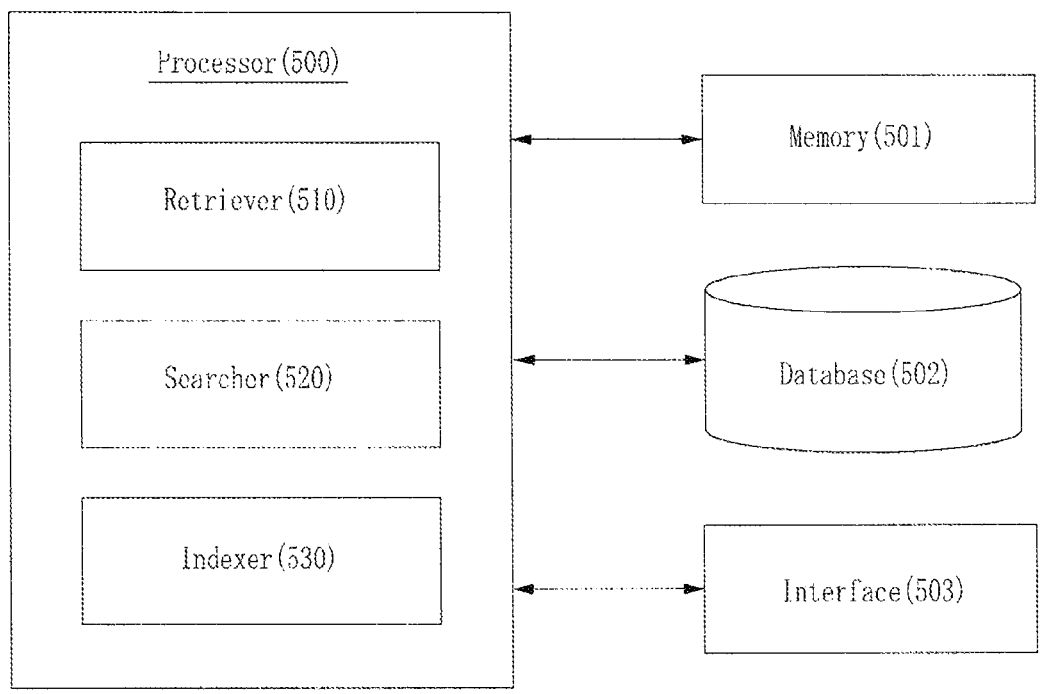
FIG. 5 illustrates an example of a configuration of a cloud server configured to store and search for personalized data according to example embodiments.

FIG. 5 illustrates an example of a configuration of a cloud server 103 configured to store and search for personalized data according to example embodiments.

According to example embodiments, the cloud server 103 may serve as a storage medium configured to store and manage personalized data, and may also directly provide a search service about the personalized data on a server.

Referring to FIG. 5, the cloud server 103 may include a processor 500, a memory 501, a database 502, and an interface 503. During operation, the processor 500 includes a retriever 510, a searcher 520, and an indexer 530.

The memory 501 is computer readable storage medium configured to store program code for one or more operating systems and/or program code for one or more software components and/or modules for performing operations according to various example embodiments. For example, the memory 501 may store a program code that includes an instruction corresponding to a search service routine that provides a search service that may directly search for personalized data from the cloud server, and may provide a search result. Operations performed by the personalized data search system described above with reference to FIGS. 1 through 4 may be performed by the program stored in the memory 501. The memory 501 may be a hard disc, a solid state disk (SSD), a secure digital (SD) card, random access memory (RAM), read only memory (ROM), a permanent mass storage device (such as a disk drive), and/or any other like data storage mechanism capable of storing and recording data.

The database 502 serves as a storage medium capable of storing and maintaining all the information required to provide a search service, and may store personalized data stored and maintained for each user. In various embodiments, the database 502 may be configured using a plurality of data servers. In various embodiments, the database 502 may include a database management system (DBMS). The database 502 may include a relational database management system (RDBMS). In other embodiments, alternate DBMS may also be used, such as an object database (ODBMS), column-oriented DBMS, correlation database DBMS, federated database system (FDBS), and the like. According to various embodiments, the database 502 may be stored on or otherwise associated with one or more data storage devices. These data storage devices may include at least one of a primary storage device, a secondary storage device, a tertiary storage device, a non-linear storage device, and/or other like data storage devices. Furthermore, the database 502 may reside on one or morewise assocIrs, which one or more data storage devices. These data storage devi More-over, the database 502 may include one or more virtual machines, such that the physical data storage devices containing the one or more databases may be logically divided into multiple virtual data storage devices and/or databases. Alternatively, each of the one or more databases may reside on one physical hardware data storage device.

The interface 503 may support an interface between the cloud server 103 and the index request control server 104 for indexing of personalized data. The interface 503 may also support an interface between the cloud server 103 and the search API server 105 for searching for the personalized data and an interface between data servers. Interface 503 is a computer hardware component that connects the cloud server 103 to the index request control server 104 and the search API server 105 via a computer network. Interface 503 may connect the cloud server 103 to the computer network via a wired or wireless connection. Interface 503 may operate in conjunction with a wireless transmitter/receiver and/or transceiver (not shown) that is configured to operate in accordance with one or more wireless standards. The interface 503 may also include one or more virtual network interfaces configured to operate with one or more software applications.

The processor 500 is a computer processing device that is configured to carry out instructions of the program code by performing arithmetical, logical, and input/output operations. The processor 500 may include a single-core processor, a dual-core processor, a triple-core processor, a quad-core processor, etc. The processor 500 may include a microprocessor such as a central processing unit (CPU). The processor 500 may perform a variety of functions for the cloud server 103 and may process data by executing program code, one or more software modules, firmware, middleware, microcode, hardware description languages, and/or any other like set of instructions stored in the memory 501. In order to perform the variety of functions and data processing operations, the program code and/or software components are loaded into the processor 500. The program code may be provided to the processor 500 from the memory 501, one or more drive mechanisms (not shown), and/or via interface 503. For instance, during operation, the processor 500 includes retriever 510, searcher 520, and indexer 530. The program code and/or software modules for the retriever 510, searcher 520, and indexer 530 are loaded into the processor 500 from the memory 501. Once the program code for the retriever 510, searcher 520, and/or indexer 530 is loaded into the processor 500, the processor 500 may be programmed or otherwise configured to perform the various operations and functions delineated by the retriever 510, searcher 520, and/or indexer 530, thereby transforming the processor 500 into a special purpose processor. Hereinafter, a detailed configuration of the processor 500 will be described.

The retriever 510 retrieves at least one data server to which a user ID belongs through a CS API. Since a data server to be allocated to the user ID continuously varies based on a server state, a process of retrieving the data server of the user ID is required. By way of example, in response to a search request of a user associated with the user terminal 102 that is received through the cloud service platform, the retriever 510 may retrieve and select one or more data servers allocated to an ID of the user at a point in time that the search request is issued by the user terminal 102.

The searcher 520 conducts a search using the data server (s) selected by the retriever 510 (i.e., the data server to which the user ID belongs) and returns a search result to the cloud service platform. In various embodiments, the searcher 520 may create a configuration file so that the data server to which the user ID belongs may conduct a search, and may conduct a search by loading, to a memory, an index volume stored in a disc of the data server to which the user ID belongs based on the created configuration file.

The indexer 530 may perform an indexing job on the personalized data of the user through the data server selected by the index request control server 104. In various embodiments, in response to the index request for personalized data of the user received from the cloud service platform, the index request control server may retrieve the cloud server including the data server to which the user ID belongs, and may select at least one data server perform the indexing job. In various embodiments, the indexer 530 may select a data server having a smallest load from among data servers included in the cloud server 103. The selected data server(s) may perform the indexing job on the personalized data stored in the disc of the data server(s) and may distribute an index volume created through the indexing job to all the data servers included in the cloud server to which the user ID belongs through the CS API.

As described above, according to example embodiments, it is possible to maximize the efficiency of resources through an effective distribution processing and to reduce costs associated with conducting a search on data stored in a cloud server.

Figure 6:
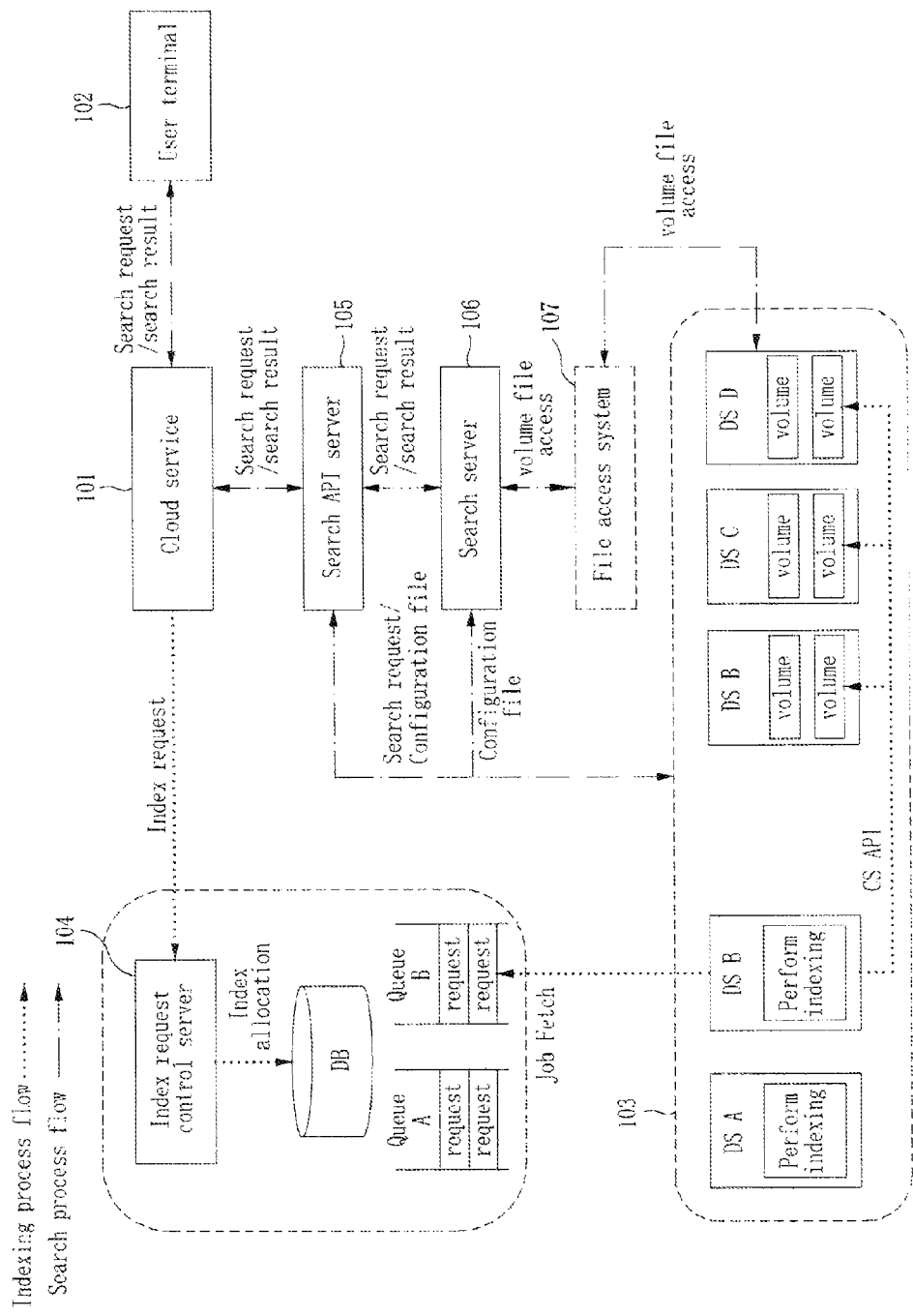
FIGS. 6 and 7 illustrate another example of a personalized data search process according to example embodiments.
Figure 7:
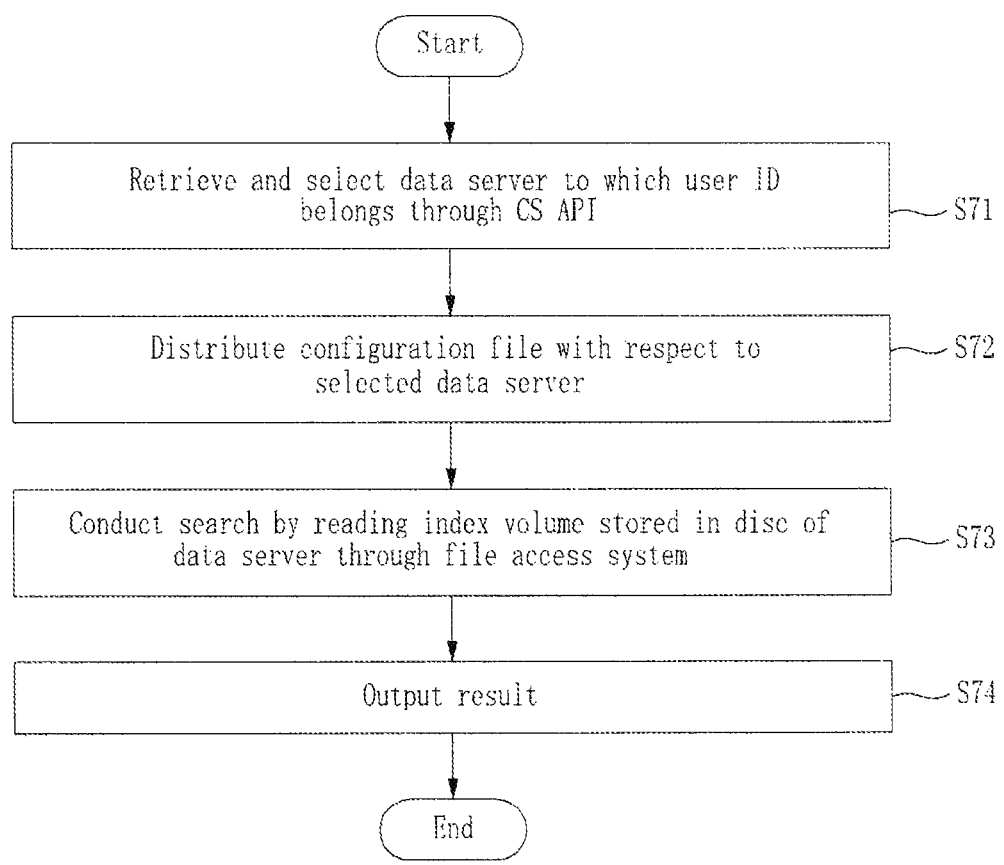

FIGS. 6 and 7 illustrate another example of a personalized data search process according to example embodiments. For illustrative purposes, the personalized data search process according to example embodiments will be described as being performed by the various entities of the personalized data search system according to example embodiments as described with reference to FIGS. 1, 3, and 5. However, it should be noted that the personalized data search process of FIGS. 6-7 may be operated by any other entities or devices that have a same or similar configuration and/or design as the entities shown in FIGS. 1, 3, and/or 5.

When the cloud server 103 is configured to directly search for personalized data stored in the cloud server 103, the cloud server 103 may need to perform a continuous management for a search, and thus, an additional resource may be required for conducting searches.

A personalized data search system according to example embodiments may use a disc of the cloud server 103 and may provide a search operation environment independent from the cloud server 103.

In operation S71, the cloud server 103 retrieves and selects a data server to which a user ID belongs through a CS API. In various embodiments, the cloud server 103 retrieves and selects the data server in response to a search request of the user terminal 102 received from the cloud service 101 through the search API server 105.

In operation S72, the cloud server 103 distributes a configuration file with respect to the selected data server. In various embodiments, the cloud server 103 may create a configuration file for search with respect to the selected data server, and may distribute the created configuration file to the search API server 105 and the search server 106. In some embodiments, the cloud server 103 may distribute a previously created configuration file for the search and may distribute the previously created configuration file to the selected data server to the search API server 105 and the search server 106.

According to various embodiments, the search API server 105 may request the search server 106 to conduct a search in response to the search request of the user terminal 102. In response to the search request of the user terminal 102 received from the cloud service 101 through the search API server 105, the search server 106 may conduct a search using the data server to which the user ID belongs based on the configuration file distributed from the cloud server 103.

In operation S73, the search server 106 conducts a search by connecting to a disc of the selected and/or retrieved data server through the file access system 107. The search server 106 may conduct the search by reading an index volume stored in the disc of the selected and/or retrieved data server. The search server 106 may open an index volume of a corresponding path by creating a symbolic link in real time using a search standard path with respect to the index volume stored in the disc of the selected and/or retrieved data server.

That is, the search server 106 conducts a search by loading, to a memory, the index volume stored in the disc of the data server to which the user ID belongs at a point in time at which the search is to be initiated. The search server 106 returns a search result to the cloud service 101 through the search API server 105.

In operation S74, the cloud service 101 outputs the search results. In various embodiments, the cloud service 101 receives the search result from the search server 106 through the search API server 105, and outputs the search result in a user verifiable form, for example, by highlighting one or more relevant search results in a search results list providing a passage of relevant text, and the like. The search results that are output include result acquired using the index volume stored in the data server to which the user ID belongs.

Since a relatively large amount of data is stored in the cloud server 103, the cloud server 103 may not conduct a search by loading the entire data to a memory. According to example embodiments, it is possible to conduct a search by creating and distributing a configuration file so that a desired (or alternatively "predetermined") data server may conduct a search at a point in time at which the search is to be initiated, and by loading an index volume stored in the data server to a memory.

Figure 8:
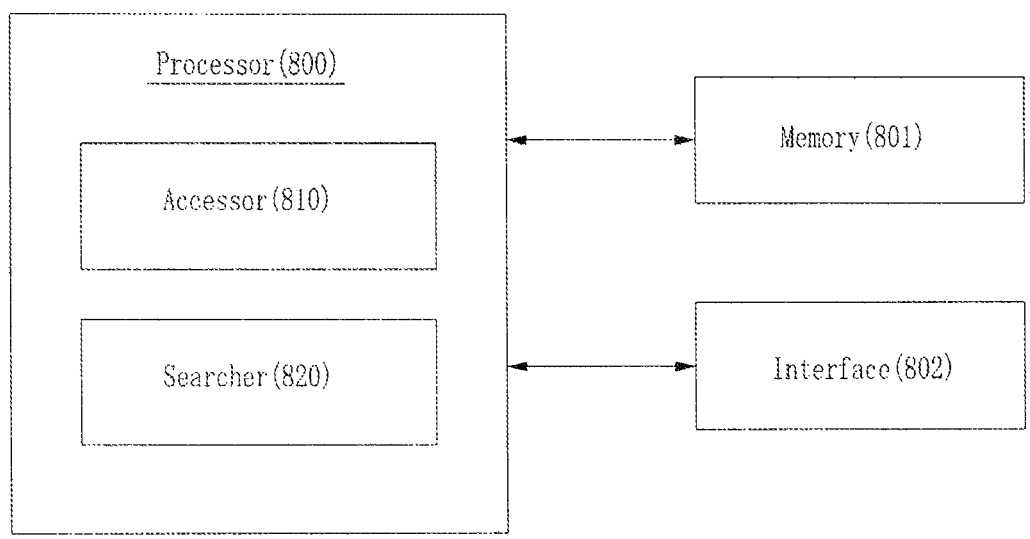
FIG. 8 illustrates another example of a configuration of a search server configured to store and search for personalized data according to example embodiments.

FIG. 8 illustrates another example of a configuration of the search server 106, which is configured to store and search for personalized data according to example embodiments.

The search server 106 may be configured to be independent from the cloud server 103 that is configured to store and maintain personalized data. Furthermore, and the search server 106 may provide a search service with respect to the personalized data.

Referring to FIG. 8, the search server may include a processor 800, memory 801, and an interface 802. During operation, the processor 800 includes an accessor 810 and a searcher 820.

The memory 801 is computer readable storage medium configured to store program code for one or more operating systems and/or program code for one or more software components and/or modules for performing operations according to various example embodiments. For example, the memory 801 may store a program that includes an instruction corresponding to a search service routine. A search service may directly search for personalized data from the cloud server, and may provide a search result. Operations performed by the personalized data search system described above with reference to FIGS. 1 and 2, and FIGS. 6 and 7 may be performed by the program stored in the memory 801. The memory 801 may be a hard disc, an SSD, an SD card, random access memory (RAM), read only memory (ROM), a permanent mass storage device (such as a disk drive), and/or any other like data storage mechanism capable of storing and recording data.

The interface 802 may support an interface between the search server 106 and a search API server 105. The interface 802 may also provide an interface between the search server 106 and the cloud server 103 for searching for personalized data stored in the cloud server 103. Interface 802 is a computer hardware component that connects the search server 106 to the cloud server 103 and the search API server 105 via a computer network. Interface 802 may connect the search server 106 to the computer network via a wired or wireless connection. Interface 802 may operate in conjunction with a wireless transmitter/receiver and/or transceiver (not shown) that is configured to operate in accordance with one or more wireless standards. The interface 802 may also include one or more virtual network interfaces configured to operate with one or more software applications.

The processor 800 is a computer processing device that is configured to carry out instructions of the program code by performing arithmetical, logical, and input/output operations. The processor 500 may include a single-core processor, a dual-core processor, a triple-core processor, a quad-core processor, etc. The processor 800 may include a microprocessor such as a central processing unit (CPU). The processor 800 may perform a variety of functions for the search server 106 and may process data by executing program code, one or more software modules, firmware, middleware, microcode, hardware description languages, and/or any other like set of instructions stored in the memory 801. In order to perform the variety of functions and data processing operations, the program code and/or software components are loaded into the processor 800. The program code may be provided to the processor 800 from the memory 801, one or more drive mechanisms (not shown), and/or via interface 802. For instance, during operation, the processor 800 includes the accessor 810 and the searcher 820. The program code and/or software modules for the accessor 810 and the searcher 820 are loaded into the processor 800 from the memory 801. Once the program code for the accessor 810 and the searcher 820 is loaded into the processor 800, the processor 800 may be programmed or otherwise configured to perform the various operations and functions delineated by the accessor 810 and the searcher 820, thereby transforming the processor 800 into a special purpose processor. Hereinafter, a detailed configuration of the processor 800 will be described.

In response to a search request of a user terminal 102 received from the cloud service 101 through the search API server 105, the cloud server 103 may retrieve and select a data server to which a user ID belongs through a CS API, may create a configuration file for search with respect to the selected data server, and may distribute the created configuration file to the search server 106.

In response to the search request of the user terminal 102 received from the cloud service 101 through the search API server 105, the accessor 810 may connect to a disc of the data server to which the user ID through the file access system 107 based on the configuration file distributed from the cloud server. In various embodiments, the accessor 810 may open an index volume of a corresponding path in real time by creating a symbolic link in real time using a search standard path with respect to the index volume stored in the disc of the data server to which the user ID belongs. A symbolic link may be any file or data structure that contains a reference to another file, data structure, and/or directory in the form of a file path. The search standard path may be a path specifying one or more directories that the data server conducts the search.

The searcher 820 reads the index volume stored in the disc of the data server to which the user ID belongs, conducts a search using the index volume, and returns a search result to the cloud service platform. That is, the searcher 820 may conduct a search by loading, to the memory 801, the index volume stored in the disc of the data server to which the user ID belongs at a point in time at which the search is to be initiated.

As described above, according to example embodiments, it is possible to efficiently operate a search system by conducting a search using only a disc of a cloud server through a configuration independent from the cloud server to search for personalized data stored in a cloud-based computing system.

The personalized data search method may include a reduced number of operations or additional operations based on the detailed description made above with reference to FIGS. 1 through 8. Also, at least two operations may be combined, and orders or locations thereof may be changed.

The example embodiments as disclosed herein may comprise program code including program instructions, software components, software modules, data files, data structures, and/or the like that are implemented by one or more physical hardware devices. Examples of program code include both machine code produced by a compiler and higher level program code that is executed using an interpreter.

The hardware devices include one or more processors. The one or more processors are computer processing devices configured to carry out the program code by performing arithmetical, logical, and input/output operations. Once the program code is loaded into the one or more processors, the one or more processors may be programmed to perform the program code, thereby transforming the one or more processors into special purpose processor(s). The one or more processors may be implemented using a processor, a controller and an arithmetic logic unit, a digital signal processor, a microcomputer, a field programmable array, a programmable logic unit, a microprocessor or any other device capable of responding to and executing instructions in a defined manner. The one or more processors may run an operating system (OS) and one or more software applications that run on the OS. The one or more processors also may access, store, manipulate, process, and create data in response to execution of the software. For purpose of simplicity, the description of the one or more processors has been singular; however, one skilled in the art will appreciated that the one or more processors may include multiple processing elements and multiple types of processing elements. For example, a processing device may include multiple processors or a processor and a controller. In addition, different processing configurations are possible, such as parallel processors.

The hardware devices may also include one or more storage devices. The one or more storage devices may be computer-readable storage media, such as random access memory (RAM), read only memory (ROM), a permanent mass storage device (such as a disk drive), and/or any other like data storage mechanism capable of storing and recording data. The one or more storage devices may be configured to store program code for one or more operating systems and/or the program code for implementing the example embodiments as described above. The program code may also be loaded from a separate computer readable storage medium into the one or more storage devices and/or the one or more processors using a drive mechanism. Such separate computer readable storage medium may include a USB flash drive, memory stick, Blu-ray/DVD/CD-ROM drive, memory card, and/or other like computer readable storage medium (not shown). The program code may be loaded into the one or more storage devices and/or the one or more processors from a remote data storage device via a network interface, rather than via a computer readable storage medium. Additionally, the program code may be loaded into the one or more storage devices and/or the one or more processors from a remote computing system that is configured to transfer and/or distribute the program code over a network. The remote computing system may transfer and/or distribute the program code via a wired interface, an air interface, and/or any other like tangible or intangible medium. The one or more processors, the one or more storage devices, and/or the program code may be specially designed and constructed for the purposes of the example embodiments, or they may be known devices that are altered and/or modified for the purposes of the example embodiments.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

It will be apparent to those skilled in the art that various modifications and variation can be made in the example embodiments without departing from the spirit or scope of the invention. Thus, it is intended that the example embodiments cover the modifications and variations of this invention provided they come within the scope of the appended claims and their equivalents.

What is claimed is:

1. A method for conducting a personalized data search in a personalized data search system including a cloud server and an index request control server, the cloud server including a plurality of data servers, each of the plurality of data servers storing personalized data for users, the method comprising:
    identifying, by the index request control server, the cloud server in response to an index request for personalized data that is received via a cloud service
    selecting, by the index request control server, one of the plurality of data servers included in the cloud server to be an indexing data server, the plurality of data servers being allocated to the desired user; and
    performing, by the indexing data server, an indexing job to generate an index volume based on personalized data stored in a disc of the indexing data server, the indexing job including extracting keywords from the personalized data;
    distributing, by the indexing data server, the index volume created through the indexing job to each of the data servers of the plurality of data servers that are allocated to the desired user
    selecting, by the cloud server in response to a search request that is received via the cloud service platform from the desired user, one of the plurality of data servers that is allocated to the desired user to be a searching data server;
    conducting, by the cloud server, a search using the searching data server, the searching data server using the index volume to conduct the search; and
    providing, by the cloud server, a search result from the searching data server based on the conducted search to the desired user via the cloud service platform,
    wherein the conducting of the search includes,
        creating a configuration file to conduct the search on the searching data server, and
        loading the index volume stored in the disc of the searching data server at a time at which the search is to be conducted.

2. The method of claim 1, wherein the selecting one of the plurality of data servers included in the cloud server to be the indexing data server comprises:
    selecting the data server from among the plurality of data servers having a smallest load relative to a load of each of the other data servers from among the plurality of data servers.

3. A personalized data search system comprising:
    a cloud server including a plurality of data servers, each of the plurality of data servers being configured to store personalized data for users;
    an index request control server configured to,
        identify the cloud server in response to an index request for personalized data that is received via a cloud service platform from a desired user, and
        select one of the plurality of data servers included in the cloud server to be an indexing data server, the plurality of data servers being allocated to the desired user;
    the indexing data server configured to,
        perform an indexing job to generate an index volume based on personalized data stored in a disc of the indexing data server, the indexing job including extracting keywords from the personalized data, and
        distribute the index volume created through the indexing job to each of the data servers of the plurality of data servers that are allocated to the desired user;
    a search application program interface (API) server configured to,
        request the cloud server to conduct a search for personalized data associated with the desired user, the search API server configured to request the cloud server in response to receiving a search request that is received via the cloud service platform from the desired user,
        receive a search result from the cloud server, and
        provide the received search result to the desired user via the cloud service platform; and
    the cloud server is configured to,
        select, in response to the search request, a data server from among the plurality of data servers that is allocated to the desired user to be a searching data server, and
        conduct, using the search data server, the search using the index volume stored in a disc of the searching data server,
    wherein the conducting of the search includes,
        creating a configuration file to conduct the search on the searching data server, and
        loading the index volume stored in the disc of the searching data server at a time at which the search is to be conducted.

4. A method for conducting a personalized data search in a personalized data search system including a cloud server, and an index request control server, and a search server, the cloud server including a plurality of data servers, each of the plurality of data servers storing personalized data for users, the search server being independent from the cloud server, the method comprising:
    identifying, by the index request control server, the cloud server in response to an index request for personalized data received from a desired user via a cloud service platform;
    selecting, by the index request control server, one of the plurality of data servers to be an indexing data server;
    performing, by the indexing data server, an indexing job based on personalized data associated with the desired user among the personalized data for users that is stored in a disc of the indexing data server;
    distributing, by the indexing data server, an index volume created through the indexing job to each of the plurality of data servers that are allocated to the desired user;
    accessing, by the search server, a disc of a data server of the plurality of data servers that is allocated to be a search data server in response to a search request received from the desired user via the cloud service platform;
    reading, by the search server, the index volume stored in the disc of the search data server;

conducting, by the search server, a search for personalized data within the disc of the searching data server using the index volume; and providing, by the search server, search results to the desired user, wherein the conducting of the search includes, creating a configuration file to conduct the search on the searching data server, and loading the index volume stored in the disc of the searching data server at a time at which the search is to be conducted.

5. The method of claim 4, wherein the accessing comprises:

creating a symbolic link in real time using a search path with respect to the index volume stored in the disc of the search data server.

6. The method of claim 4, further comprising:

selecting, by the cloud server, the searching data server in response to the search request received from the desired user via the cloud service platform;

creating, by the cloud server, a configuration file to conduct the search on the searching data server; and distributing, by the cloud server, the configuration file to the search server, and the accessing comprises accessing the disc of the searching data server based on the configuration file.

7. The method of claim 4, wherein the conducting comprises:

conducting the search by loading the index volume stored in the disc of the searching data server at a time at which the search is to be conducted.

8. The method of claim 4, wherein the selecting one of the plurality of data servers to be the indexing data server comprises:

selecting the data server from among the plurality of data servers having a smallest load relative to a load of each of the other data servers from among the plurality of data servers.

9. A personalized data search system comprising:

a cloud server including a plurality of data servers, each of the plurality of data servers being configured to store personalized data for users;

an index request control server configured to, identify the cloud server in response to an index request for personalized data that is received via a cloud service platform from a desired user, and select one of the plurality of data servers included in the cloud server to be an indexing data server, the plurality of data servers being allocated to the desired user;

the indexing data server configured to, perform an indexing job to generate an index volume based on personalized data stored in a disc of the indexing data server, the indexing job including extracting keywords from the personalized data, and distribute the index volume created through the indexing job to each of the data servers of the plurality of data servers that are allocated to the desired user;

a search server independent of the cloud server and configured to search for the personalized data stored in the cloud server; and a search application program interface (API) server configured to, request, the search server, for a search of personalized data of the desired user in response to a search request that is received from the desired user via the cloud service platform, and provide search results of the search via the cloud service platform; and the search server is configured to, read the index volume stored in disc of a searching data server selected from of the plurality of data servers, conduct the search for the personalized data by accessing the disc of the searching data server, the API server conducting the search using the index volume stored in a disk of the searching data server, and provide a search results based on the conducted search to the desired user via the cloud service platform, wherein the conducting of the search includes, creating a configuration file to conduct the search on the searching data server, and loading the index volume stored in the disc of the searching data server at a time at which the search is to be conducted.

10. The personalized data search system of claim 9, wherein the cloud server is configured to select the searching data server in response to the search request, and distribute the configuration file to the search server, and the search server is configured to create a symbolic link in real time using a search standard path with respect to the index volume stored in the disc of the searching data server based on the configuration file.

* * * * *